United States Patent [19]

Kutsumi et al.

[11] Patent Number: 5,373,442

[45] Date of Patent: Dec. 13, 1994

[54] ELECTRONIC TRANSLATING APPARATUS HAVING PRE-EDITING LEARNING CAPABILITY

[75] Inventors: Takeshi Kutsumi, Yamatokoriyama; Hitoshi Suzuki; Yoji Fukumochi, both of Nara, all of Japan

[73] Assignee: Sharp Kabushiki Kaisha, Osaka, Japan

[21] Appl. No.: 68,174

[22] Filed: May 28, 1993

[30] Foreign Application Priority Data

May 29, 1992 [JP] Japan .................. 4-139122
May 29, 1992 [JP] Japan .................. 4-139123

[51] Int. Cl.⁵ .............................................. G06F 15/38
[52] U.S. Cl. ........................ 364/419.04; 364/419.05
[58] Field of Search ............... 364/419.04, 419.06, 364/419.02, 419.05, 600

[56] References Cited

U.S. PATENT DOCUMENTS 4,685,060 8/1987 Yamano et al. ............... 364/419
4,821,230 4/1989 Kumano et al. ............... 364/419

*Primary Examiner*—Roy N. Envall, Jr.
*Assistant Examiner*—Khai Tran
*Attorney, Agent, or Firm*—Birch, Stewart, Kolasch & Birch

[57] ABSTRACT

A translation module applies an original having a sign string inserted through a keyboard to carry out a translation process of the original while interpreting the sign string in the original based on a corresponding information for supporting the translation process stored in a memory. The sign string stored in memory which is referred to at the time of translation process can be defined arbitrarily by a user of an electronic translating apparatus. Therefore, even if the sign string already exists in the original, it can be avoided that the sign string in the original is misidentified as the sign string supporting the translation process. Conversely, since a delimiter sign already existing in the original is interpreted as a sign string supporting the translation process, the load of inserting the sign string into the original can be lightened.

8 Claims, 17 Drawing Sheets

FIG.4A

| KIND | | SIGN | MEANING |
|---|---|---|---|
| PART OF SPEECH DESIGNATION SIGN | 1 | n- | NOUN |
| | 2 | v- | VERB |
| | 3 | a- | ADJECTIVE |
| | 4 | d- | ADVERB |
| SENTENCE PATTERN DESIGNATION SIGN | 1 | v1- | 1ST SENTENCE PATTERN |
| | 2 | v2- | 2ND SENTENCE PATTERN |
| | 3 | v3- | 3RD SENTENCE PATTERN |
| | 4 | v4- | 4TH SENTENCE PATTERN |
| | 5 | v5- | 5TH SENTENCE PATTERN |
| DICTIONARY DESIGNATION SIGN | 1 | uj- | USER DICTIONARY |
| | 2 | sj- | TECHNICAL TERM DICTIONARY |
| | 3 | kj- | BASIC WORD DICTIONARY |

FIG.4B

| | KIND | SIGN | MEANING |
|---|---|---|---|
| 1 | PHRASE DESIGNATION START SIGN | << | DESIGNATE THAT A PORTION ENCLOSED BY THESE SIGNS IS A PHRASE WITH A MEANING |
| 2 | PHRASE DESIGNATION END SIGN | >> | |
| 3 | PARTIAL TRANSLATION START SIGN | [[ | DESIGNATE THAT ONLY A PORTION ENCLOSED BY THESE SIGNS SHOULD BE TRANSLATED |
| 4 | PARTIAL TRANSLATION END SIGN | ]] | |
| 5 | NON-TRANSLATION PORTION START SIGN | (( | DESIGNATE THAT A PORTION ENCLOSED BY THESE SIGNS SHOULD NOT BE TRANSLATED |
| 6 | NON-TRANSLATION PORTION END SIGN | )) | |
| 7 | DIRECT OUTPUT WITHOUT TRANSLATION DESIGNATION START SIGN | {{ | DESIGNATE THAT A PORTION ENCLOSED BY THESE SIGNS SHOULD BE DIRECTLY PROVIDED AS A SOURCE LANGUAGE WITHOUT BEING SUBJECTED TO TRANSLATION PROCESS |
| 8 | DIRECT OUTPUT WITHOUT TRANSLATION DESIGNATION END SIGN | }} | |
| 9 | DIVISION TRANSLATION DESIGNATION SIGN | // | DESIGNATE THAT A SENTENCE IS DIVIDED BEFORE AND AFTER THIS SIGN |

FIG.5

⟨BEFORE SETTING OF USER DEFINITION SIGN⟩

D: BUFFER

USER DEFINITION

| I1 | I2 | I3 | I4 | I5 | I6 | I7 |
|---|---|---|---|---|---|---|
| ID | K0 | MEANING: MA | FLAG:FF | SIGN:K1 | SIGN:K2 | SIGN:K3 |
| 1 | n_ | NOUN | 0 | | | |
| 2 | v_ | VERB | 0 | | | |
| 3 | a_ | ADJECTIVE | 0 | | | |
| 4 | d_ | ADVERB | 0 | | | |
| 5 | $v_{1\_}$ | 1ST SENTENCE PATTERN | 0 | | | |
| 6 | $v_{2\_}$ | 2ND SENTENCE PATTERN | 0 | | | |
| 7 | $v_{3\_}$ | 3RD SENTENCE PATTERN | 0 | | | |
| 8 | $v_{4\_}$ | 4TH SENTENCE PATTERN | 0 | | | |
| 9 | $v_{5\_}$ | 5TH SENTENCE PATTERN | 0 | | | |
| 10 | uj_ | USER DICTIONARY | 0 | | | |
| 11 | sj_ | TECHNICAL TERM DICTIONARY | 0 | | | |
| 12 | kj_ | BASIC WORD DICTIONARY | 0 | | | |
| 13 | ⟪ | PHRASE DESIGNATION START SIGN | 0 | | | |
| 14 | ⟫ | PHRASE DESIGNATION END SIGN | 0 | | | |
| 15 | [[ | PARTIAL TRANSLATION START SIGN | 0 | | | |
| 16 | ]] | PARTIAL TRANSLATION END SIGN | 0 | | | |
| 17 | (( | NON-TRANSLATION PORTION START SIGN | 0 | | | |
| 18 | )) | NON-TRANSLATION PORTION END SIGN | 0 | | | |
| 19 | {{ | DIRECT OUTPUT WITHOUT TRANSLATION DESIGNATION START SIGN | 0 | | | |
| 20 | }} | DIRECT OUTPUT WITHOUT TRANSLATION DESIGNATION END SIGN | 0 | | | |
| 21 | // | DIVISION TRANSLATION DESIGNATION SIGN | 0 | | | |

FIG.6

⟨AFTER SETTING OF USER DEFINITION SIGN⟩

| ID | K0 | MEANING: MA | FLAG:FF | SIGN:K1 | SIGN:K2 | SIGN:K3 |
|---|---|---|---|---|---|---|
| 1 | n_ | NOUN | 1 | noun_ | | |
| 2 | v_ | VERB | 0 | | | |
| 3 | a_ | ADJECTIVE | 0 | | | |
| 4 | d_ | ADVERB | 0 | | | |
| 5 | $v_1$_ | 1ST SENTENCE PATTERN | 0 | | | |
| 6 | $v_2$_ | 2ND SENTENCE PATTERN | 0 | | | |
| 7 | $v_3$_ | 3RD SENTENCE PATTERN | 0 | | | |
| 8 | $v_4$_ | 4TH SENTENCE PATTERN | 0 | | | |
| 9 | $v_5$_ | 5TH SENTENCE PATTERN | 0 | | | |
| 10 | uj_ | USER DICTIONARY | 0 | | | |
| 11 | sj_ | TECHNICAL TERM DICTIONARY | 0 | | | |
| 12 | kj_ | BASIC WORD DICTIONARY | 0 | | | |
| 13 | 《 | PHRASE DESIGNATION START SIGN | 0 | | | |
| 14 | 》 | PHRASE DESIGNATION END SIGN | 0 | | | |
| 15 | [[ | PARTIAL TRANSLATION START SIGN | 0 | | | |
| 16 | ]] | PARTIAL TRANSLATION END SIGN | 0 | | | |
| 17 | (( | NON-TRANSLATION PORTION START SIGN | 0 | | | |
| 18 | )) | NON-TRANSLATION PORTION END SIGN | 0 | | | |
| 19 | {{ | DIRECT OUTPUT WITHOUT TRANSLATION DESIGNATION START SIGN | 0 | | | |
| 20 | }} | DIRECT OUTPUT WITHOUT TRANSLATION DESIGNATION END SIGN | 0 | | | |
| 21 | // | DIVISION TRANSLATION DESIGNATION SIGN | 1 | : | , | |

FIG. 7

BUFFER : T1

An n_symbol means that the word which is marked with the symbol is a noun.

FIG. 8

<ORIGINAL>

An n_symbol means that the word which is marked with the symbol is a noun.

<TRANSLATION> ⇩ n_ シンボルは、該シンボルが付された単語は、名詞であることを意味する。

FIG. 9A

USER DEFINITION
SIGN CORRESPONDING
TO ID=1

P: BUFFER

| LN | WORD:W | KF1 | KF2 | KF3 |
|---|---|---|---|---|
| 0 | | | | |
| 1 | An | | | |
| 2 | | | | |
| 3 | n_symbol | | | |
| 4 | | | | |
| 5 | means | | | |
| 6 | | | | |
| 7 | that | | | |
| 8 | | | | |
| 9 | the | | | |
| 10 | | | | |
| 11 | word | | | |
| 12 | | | | |
| 13 | which | | | |
| 21 | the | | | |
| 22 | | | | |
| 23 | symbol | | | |
| 24 | | | | |
| 25 | is | | | |
| 26 | | | | |
| 27 | a | | | |
| 28 | | | | |
| 29 | noun | | | |
| 30 | | | | |
| 31 | . | | | |
| 32 | | | | |

FIG. 9B

NO USER
DEFINITION SIGN

P: BUFFER

| LN | WORD:W | KF1 | KF2 | KF3 |
|---|---|---|---|---|
| 0 | | | | |
| 1 | An | | | |
| 2 | | | | |
| 3 | symbol | 1 | | |
| 4 | | | | |
| 5 | means | | | |
| 6 | | | | |
| 7 | that | | | |
| 8 | | | | |
| 9 | the | | | |
| 10 | | | | |
| 11 | word | | | |
| 12 | | | | |
| 13 | which | | | |
| 21 | the | | | |
| 22 | | | | |
| 23 | symbol | | | |
| 24 | | | | |
| 25 | is | | | |
| 26 | | | | |
| 27 | a | | | |
| 28 | | | | |
| 29 | noun | | | |
| 30 | | | | |
| 31 | . | | | |
| 32 | | | | |

FIG.10

T1: BUFFER

Reffering to a block diagram of Figure 1, a translating device according to the present invention is provided with : a CPU1 for controlling the translating process, a key board 4 for inputting an original untranslated sentence into the device and translating module 5 for storing necessary data for the translation.

FIG.11A

P : BUFFER

| LN | WORD:W | KF1 | KF2 | KF3 |
|---|---|---|---|---|
| 0 | | | | |
| 1 | Reffering | | | |
| 15 | 1 | | | |
| 16 | | | | |
| 17 | , | | | |
| 18 | | | | |
| 39 | with | | | |
| 40 | | | | |
| 41 | : | | | |
| 42 | | | | |
| 43 | a | | | |
| 59 | process | | | |
| 60 | | | | |
| 61 | , | | | |
| 62 | | | | |
| 63 | a | | | |
| 109 | translation | | | |
| 110 | | | | |
| 111 | . | | | |
| 112 | | | | |

FIG.11B

P : BUFFER

| LN | WORD:W | KF1 | KF2 | KF3 |
|---|---|---|---|---|
| 0 | | | | |
| 1 | Reffering | | | |
| 15 | 1 | | | |
| 16 | | | | |
| 17 | | 21 | | |
| 18 | | | | |
| 39 | with | | | |
| 40 | | | | |
| 41 | | 21 | | |
| 42 | | | | |
| 43 | a | | | |
| 59 | process | | | |
| 60 | | | | |
| 61 | | 21 | | |
| 62 | | | | |
| 63 | | | | |
| 109 | translation | | | |
| 110 | | | | |
| 111 | . | | | |
| 112 | | | | |

FIG.12

<ORIGINAL>

Reffering to a block diagram of Figure 1, a translating device according to the present invention is provided with : a CPU1 for controlling the translating process, a key board 4 for inputting an original untranslated sentence into the device and translating module 5 for storing necessary data for the translation.

<TRANSLATION>

図1のブロック図を参照して、本発明に係る翻訳装置は 次のものを備えて構成される。即ち、翻訳処理を制御するためのCPU1, 翻訳されてない原文を該装置に入力するためのキーボード4 および翻訳のための必要データをストアするための翻訳モジュール5 である。

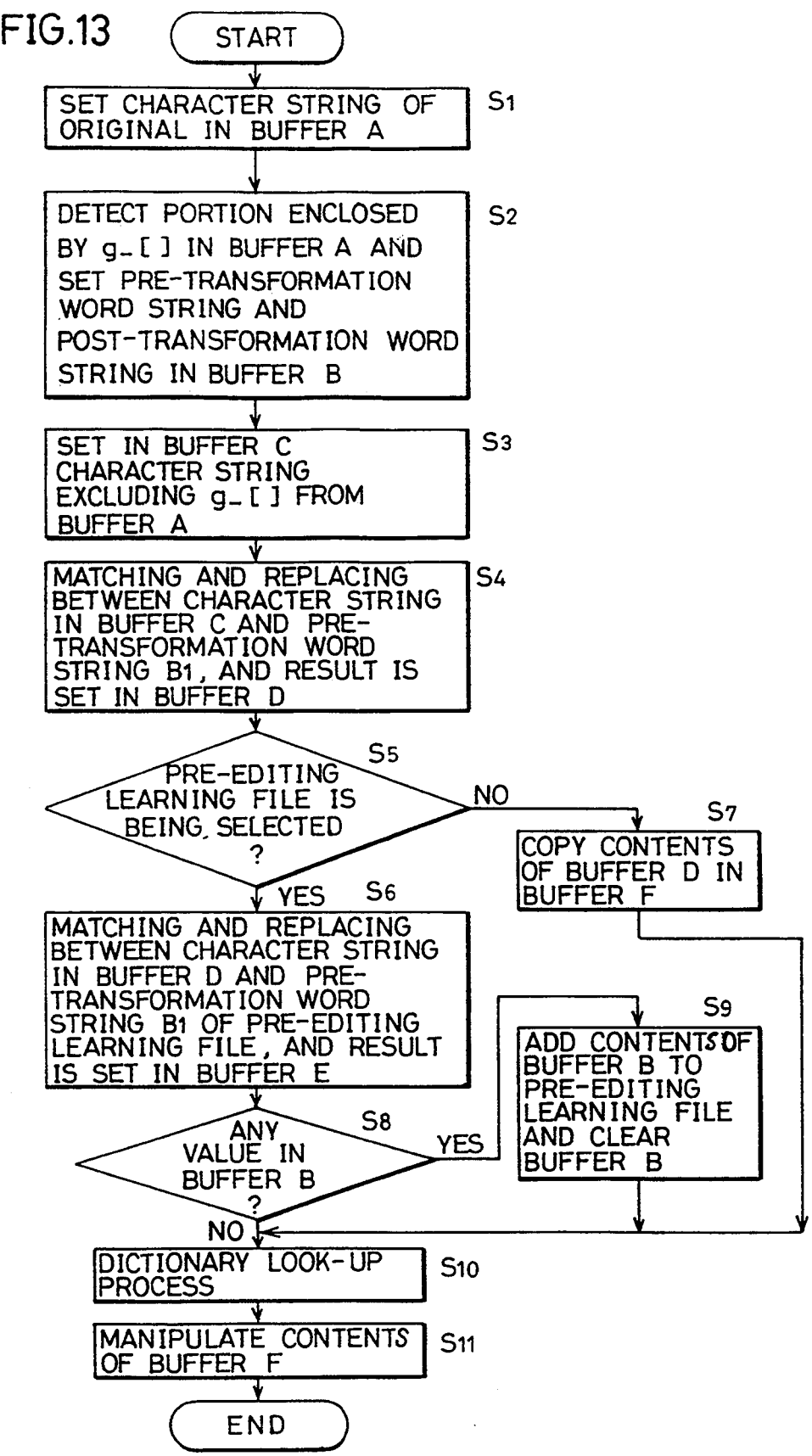

FIG.15

| | 《ENGLISH》 | | 《TRANSLATION》 |
|---|---|---|---|
| No 1 | The invention uses the said components for the device. | →No 5 | 発明は、装置のために言われた構成要素を使う。 |
| No 2 | The invention uses g_[ the a_said ] components for the device. | →No 6 | 発明は、装置のために前記の構成要素を使う。 |
| No 3 | The invention uses the said components for the device. | →No 7 | 発明は、装置のために前記の構成要素を使う。 |
| No 4 | It v_means that the component is good. | →No 8 | それは、構成要素が良いことを意味する。 |

FIG.16

A : BUFFER

|The invention uses g_[ the a_said ] components for the device.|

FIG.17

B : BUFFER

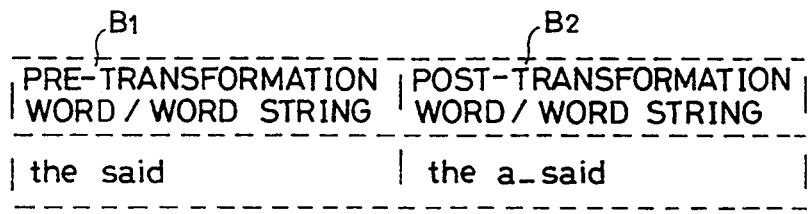

| PRE-TRANSFORMATION WORD / WORD STRING | POST-TRANSFORMATION WORD / WORD STRING |
|---|---|
| the said | the a_said |

FIG.18

C : BUFFER

|The invention uses the a_said components for the device.|

FIG.19

D : BUFFER

|The invention uses the a_said components for the device.|

FIG.20

E : BUFFER

|The invention uses the a_said components for the device.|

FIG.22

BUFFER: F

| WORD POSITION (F1) | WORD CHARACTER STRING (F2) | PART OF SPEECH (F3) | PART OF SPEECH (F4) | PART OF SPEECH (F5) | PRE-EDITING SIGN (F6) |
|---|---|---|---|---|---|
| 0 | The | ARTICLE | | | |
| 1 | invention | NOUN | | | |
| 2 | uses | VERB | NOUN | | |
| 3 | the | ARTICLE | | | |
| 4 | said | VERB | ADJECTIVE | | a- |
| 5 | components | NOUN | | | |
| 6 | for | PREPOSITION | | | |
| 7 | the | ARTICLE | | | |
| 8 | device | NOUN | | | |
| 9 | . | PERIOD | | | |

RECORD

FIG.14

| SIGN FOR DESIGNATING LEARNING OF PRE-EDITING | MEANING |
|---|---|
| g_[.....] | LEARN PRE-EDITING OF CHARACTER STRING ENCLOSED BY SIGNS "g_[" AND "]" |

ELECTRONIC TRANSLATING APPARATUS HAVING PRE-EDITING LEARNING CAPABILITY

BACKGROUND OF THE INVENTION

1. Field of the Invention

The present invention relates to an electronic translating apparatus which can enhance efficiency and accuracy of translation by a user carrying out a pre-editing process to an original in advance during a translation process, and to an improvement thereof.

2. Description of the Background Art

Conventionally, there has been such an electronic translating apparatus as follows. The electronic translating apparatus includes a key board, a CPU, a memory, a CRT (Cathode Ray Tube) and the like. A source language applied through the key board is entered as data into a translation module for a translation process prepared as a program by control of the CPU. The translation module translates the applied source language into a target language by using a dictionary data, a grammar rule, a tree structure transformation rule and the like prestored in the memory. The target language obtained by translation is provided to the CRT and the like together with the source language. The translation result is indicated to the user. When the electronic translating apparatus is an apparatus for translating English into Japanese, the source language is English, and the target language is Japanese. A sentence of the source language applied to the electronic translating apparatus is referred to as an original, and a sentence of the target language provided as an output result of the electronic translating apparatus is referred to as a translation.

In the above-described translation module, a morphological analysis is carried out to the original. By the morphological analysis, the original has each word identified by the part of speech to be extracted. The translation module carried out a syntax analysis by using a dictionary and a grammar rule based on the part of speech obtained by the morphological analysis to provide all possible syntax structures, resulting in provision of a plurality of translation results. Therefore, the user must appropriately select a correct translation out of the plurality of translation results. Since the translation module must provide all possible syntax structures, it took a long time to carry out the syntax analysis in the translation module, causing a decrease in translation efficiency. In order to increase the translation efficiency, another electronic translating apparatus has been proposed. The electronic translating apparatus can limit candidates for the syntax structures and increase the speed of the syntax analysis in the translation module by a user applying a pre-editing process to the original before carrying out translation. The pre-editing process here is to specify the part of speech of a particular word and the syntax structure at the time of the translation process in the translation module, by preparing a plurality of kinds of special character strings/sign strings which are not ordinarily used in the original to predefine them as "pre-editing signs", to be appropriately inserted into the original by the user, thereby supporting the translation process.

As described above, although an electronic translating apparatus which intends to enhance the translation efficiency by using pre-editing signs has been proposed, the electronic translating apparatus has had the following problems.

There was a possibility that the "pre-editing sign" coincides with a character string or a sign string already used in the original. More specifically, although a character string/sign string which has an extremely low possibility of appearance in an ordinary original is predefined as a pre-editing sign, there still remains the possibility of the appearance of a character string/sign string which coincides with the pre-editing sign in the ordinary original. Especially in an original including a numerical expression and the like, there is an extremely high possibility of coincidence of a part of the numerical expression with the pre-editing sign. In translating an original including a character string or sign string which coincides with the pre-editing sign, the translation module carried out the translation process by recognizing as the pre-editing sign the sign string or character string which coincides with the pre-editing sign in the original, causing a problem that correct translation was not carried out.

The work of inserting the "pre-editing sign" into the original in advance was itself troublesome. More specifically, in an electronic translating apparatus having pre-editing signs inserted, pre-editing signs used at a high frequency are signs for designating functions of: dividing a sentence; translating a sentence excluding a specific portion of the sentence; translating a sentence including a specific portion of the sentence provided directly as a source language, and the like. These functions are frequently used because they are easily designated compared to designation of a part of speech of a word and designation of a sentence pattern. When such functions are designated, a portion in the original at which the pre-editing sign should be inserted often coincides with a portion where a delimiter sign already exists based on a notational rule of the source language. For example, if the source language is English, "one sentence" is treated as one unit to carry out a syntax analysis in the conventional electronic translating apparatus. The "one sentence" here is a group of words between a period (.) and a period. Even if there exist a comma (,), a colon (:), a semicolon (;) and the like the "one sentence", these are regarded as delimiter signs within the "one sentence", and not as boundaries of the "one sentence" in carrying out the syntax analysis. However, in the original, these delimiter signs are reasonably used to indicate some division of meaning. Therefore, when the "one sentence" is divided at the portions of these delimiter signs, that is, the "one sentence" is translated in the translation module by inserting into the portions of these delimiter signs pre-editing signs having a function of dividing a sentence, the sentence is syntax-analyzed more accurately or at a higher speed than the case of direct translation of the original without inserting the pre-editing signs, whereby a more accurate translation can be obtained efficiently. The work of inserting pre-editing signs having a function of dividing a sentence into the original one by one is merely insertion of pre-editing signs into portions already having delimiter signs for dividing a sentence. Therefore, the work of insertion of pre-editing signs was cumbersome for users.

Description will now be given to an example of a pre-editing process. For example, when an original of "The invention uses the said components for the device." is applied, the electronic translating apparatus interprets the word "said" in the original as a verb to carry out translation. In order to correct this misinterpretation, for example, a pre-editing process is applied to the original so that the original is rewritten into "The invention uses the a— said components for the devices." That is, a pre-editing sign "a—" is attached to the word "said". As a result, it is possible to designate the part of speech of the word to be an adjective at the time of translation. In a patent related document, the word "said" is used at a high frequency, and the word "said" is used not as a verb but as an adjective at a high possibility. As similar examples, in a patent related document, a word "means" is used not as a verb but as a noun at a high frequency. In a finance related document, a word "close" is used not as a verb but as a noun at a high frequency.

As described above, in a document related to a particular field, a word to which the same pre-editing should be applied repeatedly tends to be specified. Therefore, when a pre-editing process was carried out to designate a part of speech of a particular word in the original as described above, in order to obtain a correct translation, it was necessary to carry out the pre-editing process repeatedly, whereby efficiency of translation work was low.

Other than the above-described designation of the part of speech, the pre-editing process includes designation of the relation between words in the original, designation of a group of words in the original at the time of translation, elimination of a word/phrase and addition of a word/phrase, and the like. In order to prevent a decrease of efficiency of the translation work caused by repetition of such a pre-editing process, a method is considered of carrying out global retrieval/replacement of a character string in the original which requires the pre-editing process. By using such a method, it is not necessary to repeat the same pre-editing process, thus the efficiency of the translation work is improved. However, in an extreme case, the global retrieval/replacement of a character string causes the original to be substantially rewritten, resulting in difficulty of understanding the contents of the original. For example, when a process of eliminating a word/phrase in the original is carried out globally, the original is rewritten substantially. Even if the original and the translation were indicated in a corresponding format, it was impossible to understand the contents of the original, causing a problem that it was difficult to determine whether or not the translation was correct.

When the same pre-editing process was effected on the original globally, it was not possible to carry out the process while confirming interactively the effect of the pre-editing process.

SUMMARY OF THE INVENTION

One object of the present invention is to provide an electronic translating apparatus which can improve efficiency of editing when a user edits an original for translation by using a sign string supporting translation.

Another object of the present invention is to provide an electronic translating apparatus which can lighten the burden of the user regarding editing when the user edits the original for translation by using a sign string supporting translation.

Still another object of the present invention is to provide an electronic translating apparatus which can always carry out accurate translation when the user edits the original for translation by using a sign string supporting translation.

In order to achieve the above-described objects, the electronic translating apparatus according to the present invention includes an externally operable input portion, a sign string insertion portion, a storage portion, and a translation control portion. The sign string insertion portion is structured such that a sign string supporting the translation process is inserted into the original through the input portion. The storage portion is structured to store at least one piece of information supporting translation and at least one sign string corresponding to each piece of the information.

The translation control portion receives the original having a sign string inserted by the sign string insertion portion to carry out a translation process while interpreting the sign string in the original based on the corresponding information stored in the storage portion. The sign string is structured such that it can be arbitrarily defined by the user of the electronic translating apparatus.

The above-described electronic translating apparatus further includes a learning designation portion, a learning portion, and an editing portion. The translation control portion further includes a first translation control portion.

In the structure, the learning designation portion designates whether or not a sign string supporting the translation process inserted into the original by the sign string insertion portion should be learned for every word/word string to which the sign string is attached. The learning portion learns the sign string designated by the learning designation portion in association with a word/word string to which the sign string is attached. The editing portion edits the original by attaching to a learned word/word string which is learned by the learning portion out of a plurality of words/word strings in the original, a sign string relevant to the learned word/word string.

The first translation control portion carries out the translation process while receiving the original edited by the editing portion to interpret the sign string in the original based on the corresponding information supporting the translation process stored in the storage portion.

According to the electronic translating apparatus of the present invention, definition of the sign string stored corresponding to the information supporting the translation process in the storage portion can be arbitrarily changed by the user of the apparatus. Therefore, even if there already exist in the original sign strings stored in the storage portion and defined by the electronic translating apparatus individually, by merely changing the definition, the sign strings in the original cannot be taken for the sign strings defined by the electronic translating apparatus, whereby it is possible to carry out a translation process at a high accuracy. Furthermore, since the user can arbitrarily define the delimiter sign already existing in the original as the sign string supporting translation, it is not necessary to insert the sign strings into the original one by one.

By merely designating learning of the sign string in the original through the learning designation portion, the sign string is learned by the learning portion in association with a word/word string to which the sign string is attached. The editing portion reedits the original by attaching the learned relevant sign string to a word/word string in the original corresponding to the learned word/word string according to the contents learned by the learning portion. Therefore, even if several words/word strings corresponding to the learned word/word string exist in the original, it is not necessary to attach the sign string repeatedly for editing. As a result, the work of the editing process by attaching the sign string to the original for supporting the translation process is simplified, causing the efficiency of the translation process itself to improve.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B how an example of the pre-editing signs applied to the first to the third embodiments of the present invention.

FIG. 5 is a diagram showing an example of contents of a buffer in which only prescribed pre-editing signs are stored according to the first embodiment of the present invention.

FIG. 6 a diagram showing an example of contents of a buffer in which the prescribed editing signs and a user-defined pre-editing signs are stored according to the first embodiment of the present invention.

FIG. 7 is a diagram showing an example of contents of a buffer in which the original of the first embodiment of the present invention is stored.

FIG. 8 is a diagram showing an example of a screen display of a result translated from the original of FIG. 7.

FIGS. 9A and 9B show an example of the contents of a buffer in which information on the kind and the position of the pre-editing sign included in the original of FIG. 7 is stored by comparing the case where definition of a pre-editing sign is carried out by the user with the case where definition is not carried out.

FIG. 10 is a diagram showing an example of contents of a buffer in which an original of the second embodiment the present invention is stored.

FIGS. 11A and 11B show an example of contents of a buffer in which information on the kind and the position of the pre-editing sign included in the original of FIG. 10 is stored.

FIG. 12 is a diagram showing an example of a screen display of a result translated from the original of FIG. 10.

FIG. 13 is a flow chart showing a process in a dictionary look-up morphological analysis portion of FIG. 2 according to the third embodiment of the present invention.

FIG. 14 is a diagram showing an example of a sign for designating learning of pre-editing used in the third embodiment of the present invention.

FIG. 15 is a diagram showing an example of a screen display of a translation result according to the third embodiment of the present invention.

FIG. 16 is a diagram showing an example of contents of a buffer A which is referred to at the time of carrying out the process according to the flow chart of FIG. 13.

FIG. 17 is a diagram showing an example of contents of a buffer B which is referred to at the time of carrying out the process according to the flow chart of FIG. 13.

FIG. 18 is a diagram showing an example of contents of a buffer C which is referred to at the time of carrying out the process according to the flow chart of FIG. 13.

FIG. 19 is a digram showing an example of contents of a buffer D which is referred to at the time of carrying out the process according to the flow chart of FIG. 13.

FIG. 20 is a diagram showing an example of contents of a buffer E which is referred to at the time of carrying out the process according to the flow chart of FIG. 13.

FIG. 22 is a diagram showing an example of the contents of the buffer F of FIG. 21 after data is up-dated.

DESCRIPTION OF THE PREFERRED EMBODIMENTS

The first to the third embodiments of the present invention will be described in detail hereinafter with reference to the drawings.

The electronic translating apparatus applied to the first to the third embodiments-is a translating apparatus in which English is applied as a source language, and in which Japanese is provided after translation as a target language. However, the source language and the target language are not limited to English and Japanese, respectively.

Figure 1:
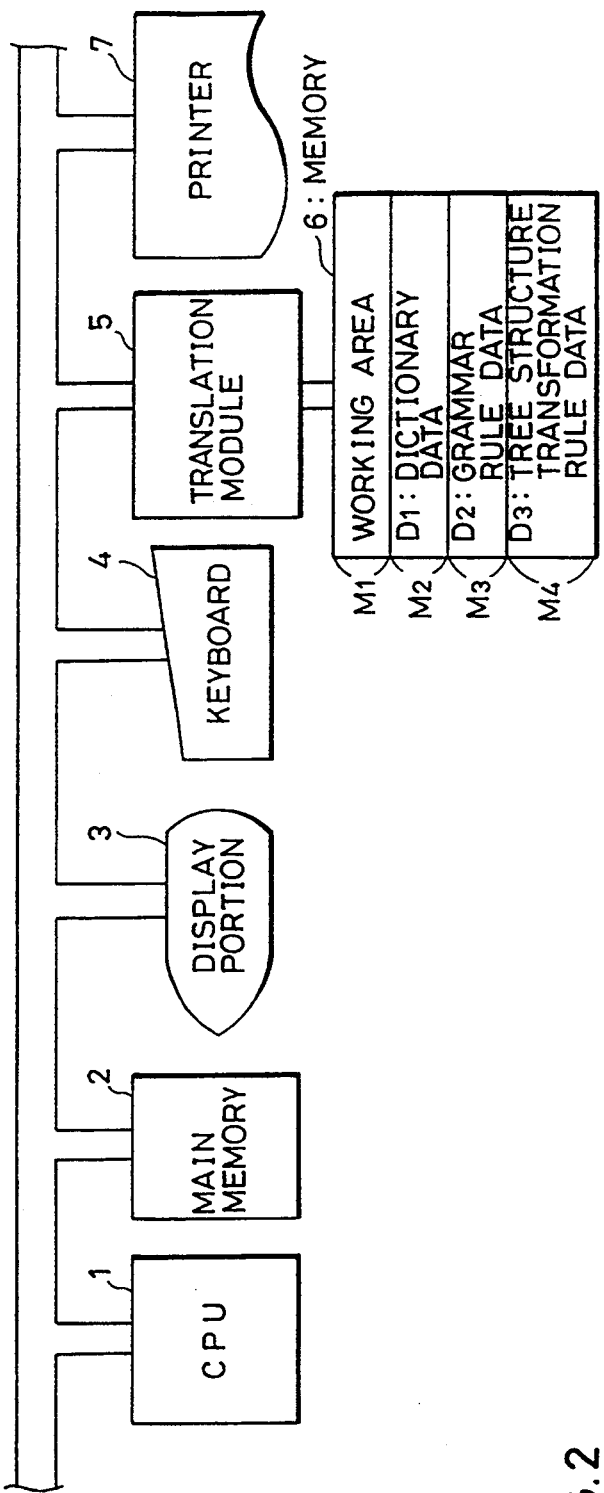
FIG. 1 is a block diagram of a structure of an electronic translating apparatus applied to the first to third embodiments of the present invention.

FIG. 1 is a block diagram of a structure of the electronic translating apparatus applied to the first to the third embodiments of the present invention.

The electronic translating apparatus of FIG. 1 includes a CPU (Central Processing Unit) 1 for concentrately managing and controlling the electronic translating apparatus, a main memory 2 for storing data including a program required for a translation process, a display portion 3 including a CRT (Cathode Ray Tube) or an LCD (Liquid Crystal Display), a keyboard 4 for applying data externally, a memory 6, a translation module 5 for translating an applied source language into a target language while accessing memory 6, and a printer 7 for printing out a translation result. Respective portions are communication-connected with each other through a bus.

Memory 6 includes areas M1 to M4. Area M1 is used as a working area at the time of the translation process. A dictionary data D1, a grammar rule data D2, and a tree structure transformation rule data D3 are prestored in areas M2, M3 and M4, respectively.

Figure 2:
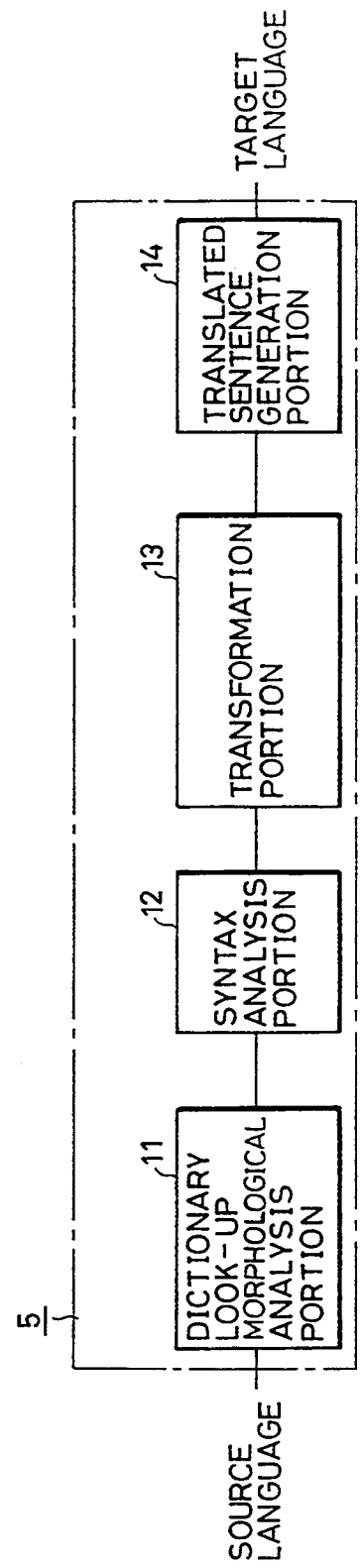
FIG. 2 is a diagram of a structure of a translation module applied to the first to the third embodiments of the present invention.

The structure of translation module 5 is shown in FIG. 2. Translation module 5 includes a dictionary look-up morphological analysis portion 11, a syntax analysis portion 12, a transformation portion 13, and a translated sentence generating portion 14.

Referring to FIGS. 1 and 2, translation operation of the electronic translating apparatus will now be described.

An original applied through keyboard 4 is sent one sentence at a time to translation module 5 by control of CPU 1. Translation module 5 uses dictionary data D1, grammar rule data D2, and tree structure transformation rule data D3 stored in memory 6 to translate the applied one sentence source language into the target language. In detail, as shown in FIG. 2, the one sentence source language is subjected to a morphological process to be divided into a sequence of morphemes by dictionary look-up morphological analysis portion 11 using dictionary data D1 of memory 6. A morpheme is a minimum language unit constituting a sentence, including a word, a prefix and a suffix. At the time of the morphological process, grammatical information such as the part of speech and a translation for each divided word can be obtained, and tense/person/number are further analyzed. After completion of the morphological process of the sentencer a syntax process is carried out on the assumption that the morphemes constituting the sentence are correctly extracted in syntax analysis portion 12. In syntax analysis portion 12, a grammatical structure of the sentence is made clear in accordance with dictionary data D1 and grammar rule data D2 of memory 6, and a structure analysis tree showing the relation between words is determined. In transformation portion 13, the structure analysis tree obtained in syntax analysis portion 12 of the preceding stage is transformed into a structure analysis tree for a translation by using tree structure transformation rule data D3 in memory 6. In translated sentence generating portion 14, an auxiliary appropriate for a translated sentence of the target language is added, and the obtained translated sentences are sequentially provided from translation module 5 by using the target language to be provided to display portion 3, printer 7 and the like by control of CPU 1. At the time of providing the translated sentence, a corresponding original sentence is also indicated. Therefore, the user can correct the translation result through keyboard 4 while comparing the two sentences indicated on the screen of display portion 3.

Figure 3:
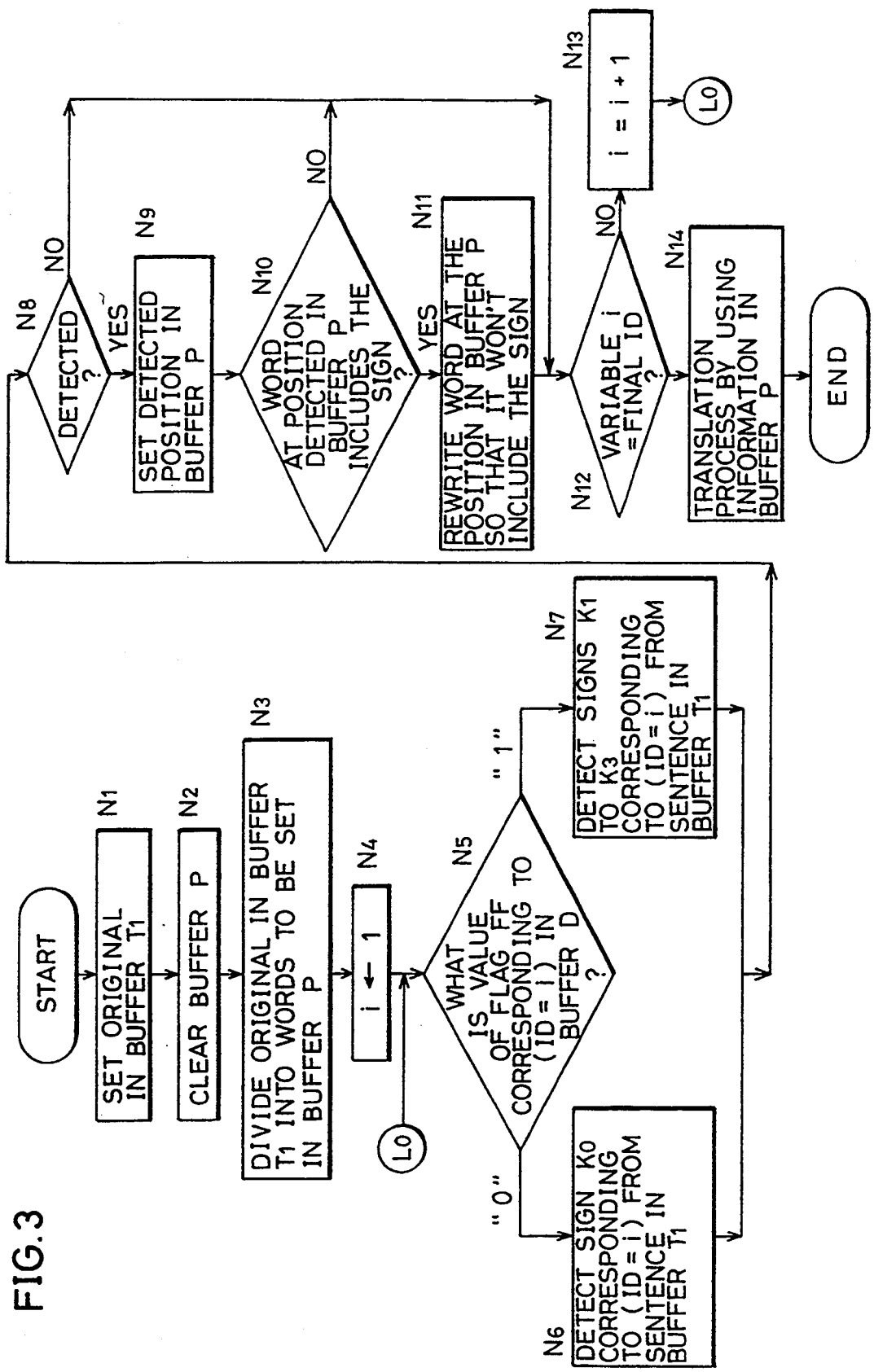
FIG. 3 is a flow chart for explaining a translation operation of an original including a pre-editing sign of the electronic translating apparatus according to the first and the second embodiments of the present invention.

FIG. 3 is a flow chart for explaining translation operation of the original including a pre-editing sign of the electronic translating apparatus according to the first and the second embodiments of the present invention.

FIGS. 4A and 4B show an example of pre-editing signs applied to the first to the third embodiments of the present invention.

Pre-editing signs applied to the first to the third embodiments are roughly divided into two kinds in forms. The first kind, as shown in FIG. 4A, attaches the sign to the head of a word to modify the same. For example, as shown FIG. 4A, when a pre-editing sign "n_" is attached to the head of a word, the part of speech of the word is designated, and the original is edited so that the word is translated as a noun. When a pre-editing sign "vl_" is attached to the head of a sentence, a sentence pattern of the sentence is designated, and the original is edited so that the sentence is subjected to the translation process as a first sentence pattern of English (subject-+verb). When a pre-editing sign "uj_" is attached to the head of a word, the original is edited so that the word is subjected to the translation process by using dictionary data individually prepared by the user.

The second kind inserts a pre-editing sign between words in order to make division before and after the sign with some meaning. For example, as shown in FIG. 4B, the original is pre-edited to designate that a portion enclosed by a pre-editing sign "((" and a pre-editing sign "))" should not be translated.

The pre-editing process of the original using the above-described pre-editing sign is carried out by the user inserting the pre-editing sign utilizing keyboard 4 at an arbitrary position of the original indicated on display portion 3. The pre-edited original is applied to translation module 5.

In the electronic translating apparatus of the first embodiment, pre-editing signs, shown in FIGS. 4A and 4B, are prescribed. However, the electronic translating apparatus has a characteristic that pre-editing signs can be arbitrarily defined by the user of the apparatus. Therefore, according to the first embodiment, by inserting a pre-editing sign newly defined by the user into the original, the apparatus can carry out the translation process of the original including the newly defined pre-editing sign.

FIG. 5 is a diagram showing an example of the contents of a buffer (before setting of signs defined by users) in which only the prescribed pre-editing signs according to the first embodiment of the present invention are stored.

FIG. 6 ,is a diagram showing an example of the contents of a buffer (after setting of signs defined by users) in which the prescribed pre-editing signs and pre-editing signs defined by the user according to the first embodiment of the present invention are stored.

Prescribed pre-editing signs shown in FIGS. 4A and 4B are stored in buffer D as shown in FIG. 5. In buffer D, the pre-editing signs are stored in a table form, the table of which includes items I1 to I7. Item I1 stores an identification number ID identifying a pre-editing sign, item I2 stores a prescribed sign K0 representing the prescribed pre-editing sign, and item I3 stores the meaning MA which in translation, corresponds to prescribed sign K0. In buffer D, item I4 stores a user definition flag FF, and items I5 to I7 respectively store user definition signs K1 to K3. Each of user definition signs K1 to K3 is a pre-editing sign for which the user arbitrarily defines corresponding meaning MA instead of corresponding prescribed sign K0. When a pre-editing sign defined by the user is set in any of signs K1 to K3, corresponding user definition flag FF is set at "1". Conversely, the flag FF is set at "0" when any of signs K1 to K3 is not set. Buffer D is stored in main memory 2 or memory 6. The contents of buffer D are indicated on display portion 3 according to the user's input utilizing keyboard 4. The user can arbitrarily set respective user definition signs K1 to K3 in buffer D indicated on display portion 3 by operating keyboard 4. When any pre-editing signs are not defined by the user, the contents of buffer D are as shown in FIG. 5. At this time, the user definition flag FF is set at "0" for every prescribed sign K0, and user definition signs K1 to K3 are all yet to be set.

It is assumed that a new form of a pre-editing sign is defined by a user. The newly defined pre-editing sign includes a sign of identification number ID=1 having meaning MA of "noun", and a sign of identification number ID=21 of "division translation designation sign" in buffer D of FIG. 5. The form of the pre-editing sign of "noun" is defined as "noun_", and the form of "division translation designation sign" is defined as ":" and "," by the user. As a result, the contents of buffer D of FIG. 5 are updated as shown in FIG. 6.

In FIG. 6, user definition sign K1 of "noun" of identification number ID=1 is defined as "noun_", and user definition signs K1 and K2 of "division translation designation sign" of identification number ID=21 are defined as ":" and "," to be respectively set. CPU 1 sets corresponding user definition flag FF at "1" in response to any of user definition signs K1 to K3 newly set by the user. Therefore, as shown in buffer D of FIG. 6, user definition flags FF corresponding to number ID=1 and number ID=21 are set at "1". Depending on how the user definition flag FF is set, it is specified that user definition signs with respect to the two kinds of pre-editing signs exist at the time of the translation process, and it is specified that corresponding prescribed sign K0 is invalid. In this case, in buffer D of FIG. 6, since the user definition flag FF of number ID=1 is set at "1", prescribed sign K0="n_" corresponding to number ID=1 no longer has a meaning as a pre-editing sign. Similarly, prescribed sign K0="//" corresponding to number ID=21 no longer has a meaning as a pre-editing sign. Prescribed sign K0 corresponding to each of numbers ID=2 to ID=20 where the user definition flag FF is not set at "1" still has a meaning as a pre-editing sign.

According to the flow chart of FIG. 3, description will be given to the translation process in the case where a pre-editing sign is defined in advance by the user.

FIG. 7 is a diagram showing an example of the contents of a buffer in which the original of the first embodiment of the present invention is stored.

FIG. 8 is a diagram showing an example of a screen display of a result translated from the original of FIG. 7.

FIGS. 9A and 9B show examples of the contents of buffers in which information is stored on the kind and the position of a pre-editing sign included in the original of FIG. 7, for the case where a pre-editing sign is defined by the user (FIG. 9A) versus the case where a pre-editing sign is not defined by the user (FIG. 9B).

Description will first be given to the case where the translation process is mainly effected on the original including a character string coinciding with a prescribed pre-editing sign without recognizing the coinciding character string as a pre-editing sign.

The original as shown in FIG. 7 is stored in buffer T1 of memory 2 or 6. It is desired that "n_symbol" in the original of FIG. 7 is translated into "n_       ". More specifically, when the original is translated by the electronic translating apparatus, it is desired that the character string "n_" in the original is not recognized as a pre-editing sign. In the electronic translating apparatus, by using the user definition sign "noun_", it is possible to carry out the translation process without recognizing the character string "n_" in the original as a pre-editing sign. Description thereof will be given hereinafter.

Before translating the original of FIG. 7, the user definition sign K1="noun_" is defined as a pre-editing sign for designating a part of speech as "noun". As a result, the contents of buffer D are updated as shown in FIG. 6 as described above, and the prescribed sign K0 ("n_") representing "noun" becomes invalid. In response to the fact that user definition sign K1 corresponding to number ID=1 is set, CPU 1 sets the corresponding user definition flag FF at "1".

Referring to the flow chart of FIG. 3, at step N1 (referred to as N1 in the figure), the original to be translated is stored in buffer T1 as shown in FIG. 7. The original is set by the key input of the user through keyboard 4 or prestored in memory 6 or the like. CPU 1 reads the original from memory 6 and sets the original in buffer T1. Translation module 5 receives the original set in buffer T1 to translate the same into the target language by procedures of step N2 and thereafter.

At step N2, buffer P of memory 2 or 6 shown in FIG. 9A is cleared (initialized). Buffer P is for storing the kind and the position of the pre-editing sign in the original of FIG. 7, the contents of which are used as information of the pre-editing sign for the translation process. In buffer P, the pre-editing signs are stored as pre-editing sign values KF1 to KF3 represented not by the form but by the numerical value of corresponding identification number ID shown in FIG. 5 or 6. The pre-editing sign includes a sign of "modifying a word" type shown in FIG. 4A and a sign of "being inserted between words" type as shown in FIG. 4B. Therefore, buffer P is structured to distinguish and store the pre-editing signs of both types. More specifically, in buffer P of FIG. 9A, the pre-editing signs of type of FIG. 4A are stored in pre-editing sign values KF1 to KF3 whose position numbers LN are odd numbers, while the pre-editing signs of type of FIG. 4B are stored in pre-editing sign values KF1 to KF3 whose position numbers LN are even numbers.

At the next step N3, the original stored in buffer T1 is divided into words to be stored in a column of a word W of buffer P. At this time, a pre-editing sign attached to a word in the form of a suffix or affix (not delimited by a space or the like) is stored in the column of word W with the pre-editing sign still attached. At this time, buffer P is as shown in FIG. 9A.

At step N4, in order to retrieve sequentially the pre-editing sign in buffer D of FIG. 6, an initial value (=1) is set with respect to a variable i for storing the number ID of the pre-editing identification sign.

A loop process including steps N5 to N13 is repeatedly carried out until the variable i attains the final value of the number ID of buffer D with the variable i incremented by one. In the loop process, a determination is made as to whether or not any of corresponding user definition signs K1 to K3 is set for each number ID (variable i). In the case where any sign is set, even if there is prescribed sign K0 corresponding to the number ID (variable i) in the original, buffer P is processed so that it is not regarded as a pre-editing sign. Conversely, in the case where any of the signs K1 to K3 is not set, if there is prescribed sign K0 corresponding to the number ID (variable i) in the original, the contents of buffer P are processed so that it is regarded as a prescribed pre-editing sign. After completion of the loop process including steps N5 to N13, translation of the original in buffer T1 using information of buffer P is carried out at step N14, to indicate the result at display portion 3, for example, as shown in FIG. 8.

Detailed description will be given to the above-described loop process including steps N5 to N13. Buffer D is sequentially retrieved as in the following from step N5.

When the variable i=1, user definition flag FF corresponding to the number ID=1 is set at "1" (cf. FIG. 6), the process goes to the next step N7. At step N7, user definition sign K1 with respect to the pre-editing sign of the number ID=1 is detected from the original stored in buffer T1. Since the user definition sign K1 corresponding to the number ID=1 is "noun_" as shown in FIG. 6, "noun_" is retrieved from the original in buffer T1. As a result, since "noun_" does not exist in the original in buffer T1, the contents of buffer P of FIG. 9A are not updated in response to the determination result of the next step N8, and the process goes to step N12. In the process of step N12, since it is determined that the variable i does not reach the final value (21 according to FIG. 6) of the number ID, the variable i is incremented by only one at the next step N13, and the process again returns to step N5.

When the variable i=2, since the user definition flag FF corresponding to the number ID=2 of buffer D is "0", referring to FIG. 6, the process goes to step N6 in response to the determination result of step N5. In the process of step N6, prescribed sign K0 ("v—") corresponding to the number ID=2 is searched from the original in buffer T1. As a result, since "v—" does not exist in the original in buffer T1, the process goes to step N12 in response to the determination result of the next step N8.

For the respective variables i of 3 to 21 (the final value of the number ID), a loop process including steps N5→N6→N8→N12→N13→N5, or a loop process including steps N5→N7→N8→N12→N13→N5 is carried out. As a result, since a pre-editing sign corresponding to each of the numbers ID=3 to 21 does not exist in the original in buffer T1, buffer P finally attains the state of FIG. 9A. Buffer P does not change from the state right after the process of step N3. Therefore, in the process of step S14 after completion of the loop process, the original in buffer T1 is subjected to the translation process by using information (that is, assuming that no pre-editing sign exists) of buffer P as shown in FIG. 9A.

As described above, by the user redefining a pre-editing sign into a sign other than prescribed sign K0 by using user definition sign K1, it is possible to translate the original without interpreting the character string identical to the prescribed sign K0 in the original as a pre-editing sign.

In order to make comparison with the case where the above-described user definition sign predefined in advance, description will be given to the case where the original stored in buffer T1 of FIG. 7 is translated in the state where the user does not define the pre-editing sign "noun—".

In the state where the user does not define the pre-editing sign, buffer D is set as shown in FIG. 5.

In the flow chart of FIG. 3, the process of steps N1 to N4 goes similar to the above. At the time when the process up to step N4 is completed, buffer P is set as shown in FIG. 9A.

In the loop process including steps N5 to N13, the process goes as follows.

When the variable i equals 1, since the user definition flag FF corresponding to the number ID=1 is "0", the process goes to step N6. At step N6, the prescribed sign K0 corresponding to the number ID=1 is detected from the original in buffer T1. In this step, since the prescribed sign K0 corresponding to the number ID=1 is "n—" as shown in FIG. 5, "n—" is detected from the original in buffer T1 shown in FIG. 7. As a result, since "n—" exits in the original in buffer T1, the process of step N9 is carried out after the determination process of step N8.

In the process of step N9, a position at which "n—" is detected in the original in the process of step N6 is set in buffer P. More specifically, the value "1" (the value of the current variable i) of the number ID corresponding to "n—" is set at the pre-editing sign value KF1 corresponding to the position number LN=3 in buffer P. Then, the process goes to step N10.

At step N10, a determination is made as to whether or not "n—" is included in the word W corresponding to the position number LN=3 of buffer P. Since the word W (n—symbol) corresponding to the position number LN=3 includes "n—", the process goes from step N10 to the next step N11. The corresponding word W is rewritten into the form not including "n—". In other words, "n—symbol" is rewritten as "symbol", and the word W corresponding to the position number LN of FIG. 9A is updated. As a result, the column of the number LN=3 of buffer P is set as shown in FIG. 9B including the process of the above-described step N9.

For respective variables I=2 to 21 (the final value of the number ID), a loop process including steps N5→N6→N8→N12→N13→N5 is repeated. As a result, since a pre-editing sign is not detected-corresponding to any of the numbers ID=2 to 21 in the original in buffer T1, buffer P is finally set in the state of FIG. 9B. At step N14, the translation process is carried out by utilizing information of buffer P shown in FIG. 9B (that is, assuming that a pre-editing sign is added for designating a part of speech of the word "symbol" as "noun").

As described above, in the case where the user does not define a pre-editing sign, if a character string coinciding with the prescribed pre-editing sign (prescribed sign K0) exists in the original, the portion is subjected to the translation process as a pre-editing sign.

If a word to which the user definition sign K1="noun—" is attached exists in the original in buffer T1, the process of steps N9 to N11 of FIG. 3 is carried out similarly to the above. The word to which "noun—" is attached is pre-edited so that the part of speech of the word is designated as "noun" to be translated.

The second embodiment will now be described.

The electronic translating apparatus of the second embodiment has a feature that it can carry out the translation process by recognizing a character string or sign string in the original which is not originally a pre-editing sign as a pre-editing sign.

FIG. 10 is a diagram showing an example of the contents of a buffer of the second embodiment of the present invention in which the original is stored.

FIGS. 11A and 11B show an example of the contents of a buffer in which information on the kind and the position of the pre-editing sign included in the original of FIG. 10 is stored.

FIG. 12 is a diagram showing an example of a screen display of a result translated from the original of FIG. 10.

In the second embodiment, the original as shown in FIG. 10 is translated into Japanese. The original of FIG. 10 is often seen in patent related documents, in which expressions describing components are connected by a plurality of commas (,) and colons (:) into one long sentence. In general, when such a sentence is translated by the electronic translating apparatus, it is desired that the translation process is carried out after division of the original at positions of commas and colons.

In the second embodiment, in order to lighten a load of the user in dividing the above-described sentence, a pre-editing process is carried out as in the following.

Before translating the original of FIG. 10, the user defines utilizing keyboard 4 a character "," and a character ":" as pre-editing signs meaning "division translation designation". As a result, user definition signs K1 and K2 whose meaning MA corresponds to "division translation designation" are set in buffer D as in FIG. 6, and the prescribed sign K0 ("//") whose meaning MA represents "division translation designation" becomes invalid.

In the process flow of FIG. 3, at step N1, the original is stored in buffer T1 of FIG. 10.

At step N2, buffer P of FIG. 11 is cleared. At step N3, the original stored in buffer T1 of FIG. 10 is divided into words, which are stored in columns of the word W of buffer P, respectively. At this time, buffer P is set as in FIG. 11A. A plurality of words W constituting the original is stored in buffer P of FIG. 11A, and the position number LN corresponding to each word W is also stored in buffer P simultaneously.

At step N4, the variable i is initialized with a value "1" in order to retrieve buffer D of FIG. 6.

In the loop process including steps N5 to N13, the process is repeatedly carried out until the variable i attains the final value of the number ID of buffer D with the variable i incremented by one. When the variable i is in the range of i=1 to 20, a pre-editing sign corresponding to the number ID matching the variable i in buffer D does not exist in the original in buffer T1. Therefore, the contents of buffer P of FIG. 11A do not change.

When the variable i is incremented to i=21, it determined that the user definition flag FF corresponding to the number ID=21 of buffer D is set at "1" in the process of step N5, whereby the process goes to step N7. At step N7, user definition signs K1 and K2 corresponding to the number ID=21 are detected from the original in buffer T1. In detail, since user definition signs K1 and K2 of the number ID=21 are ":" and "," as shown in FIG. 6, the character ":" or "," is retrieved from the original in buffer T1 shown in FIG. 10. As a result, since characters ":" and "," exist in the original of buffer T1, the process goes to step N9 in response to determination of step N8.

In the process of step N9, in order to specify a position on the original at which ":" or "," is detected in the process of step N7, the current value of the variable i (ID=21) is stored in the pre-editing sign value KF1 corresponding to each of position numbers LN=17, 41, 61 in buffer P. Then, the process goes to step N10.

At step N10, a determination is made as to whether or not ":" or "," is included in the words W to which the position numbers LN=17, 41 and 61 correspond respectively in buffer P. The word W corresponding to the position number LN=17 is ",", the word W corresponding to the position number LN=41 is ":", and the word W corresponding to the position number LN=61 is ",". Therefore, in buffer P, user definition sign K1 (":") or user definition sign K2 (",") is included in the word W corresponding to each of detected position numbers LN. Therefore, the process goes from step N10 to N11, and the words W corresponding to the position numbers LN (=17, 41 and 61) are rewritten so that they do not include sign K1 or sign K2. In other words, since the words W corresponding to respective position numbers LN=17, 41 and 61 are constituted only of ":" or "," in this case, these words W are deleted. As a result, buffer P is set to the state of FIG. 11B from the state of FIG. 11A including the process of step N9.

At step N12, the variable i has attained the final value of the number ID of buffer D. Accordingly, the process goes to step N14, and buffer P is finally set at the state of FIG. 11B. In the process of step N14, the original stored in buffer T1 of FIG. 10 is subjected to the translation process by utilizing information in buffer P set as shown in FIG. 11B. In other words, on the assumption that between words "1" and "a" in the original in buffer T1 inserted is a pre-editing sign "//" representing "division translation designation", between words "with" and "a" inserted is the pre-editing sign "//" representing "division translation designation", and that between words "process" and "a" further inserted is the pre-editing sign "//" representing "division translation designation", the translation process is carried out.

As described above, in the second embodiment, a predetermined pre-editing sign meaning "division translation designation" and the like is redefined by the user to an appropriate delimiter sign which already exists in the original, such as "," or ":". As a result, by setting only once user definition signs K1 to K3, it is possible to obtain a result equivalent to the case where pre-editing is manually effected on the original by the user, even if the user does not carry out the pre-editing process by manually applying prescribed sign K0 one by one representing "division translation designation" and the like. In the second embodiment, the result of translation of the original in buffer T1 of FIG. 10 in accordance with information of buffer P of FIG. 11B is indicated on display portion 3 with the original and the translation indicated in a corresponding format as shown in FIG. 12.

As is clear from the above-described first and second embodiments, a function of the user's arbitrarily defining a character string or sign string used only in the pre-editing process is provided in the electronic translating apparatus which can improve efficiency or accuracy of translation by the user carrying out the pre-editing process to the original. Therefore, even if a character string or sign string identical to the prescribed sign K0 in the electronic translating apparatus exists in the original, the translation process can arbitrarily proceed not regarding these character strings or sign strings as pre-editing signs. Since it is possible to carry out the translation process by arbitrarily redefining delimiter signs already existing in the original as pre-editing signs, the present invention has the advantage that a load of applying pre-editing signs to the original can be eliminated.

The third embodiment will now be described. A function of learning pre-editing is provided in the electronic translating apparatus according to the third embodiment.

FIG. 13 is a flow chart of the process in dictionary look-up morphological analysis portion 11 of FIG. 2 according to the third embodiment of the present invention. FIG. 14 is a diagram showing an example of a sign for designating learning of pre-editing used in the third embodiment of the present invention.

FIG. 15 is a diagram showing an example of a screen display of a translation result according to the third embodiment of the present invention.

FIG. 16 is a diagram showing an example of the contents of buffer A which is referred to at the time of carrying out the process according to the flow chart of FIG. 13.

FIG. 17 is a diagram showing an example of the contents of buffer B which is referred at the time of carrying out the process according to the flow chart of FIG. 13.

FIG. 18 is a diagram showing an example of the contents of buffer C which is referred to at the time of carrying out the process according to the flow chart of FIG. 13.

FIG. 19 is a diagram showing an example of the contents of buffer D which is referred to at the time of carrying out the process according to the flow chart of FIG. 13.

FIG. 20 is a diagram showing an example of the contents of buffer E which is referred to at the time of carrying out the process according to the flow chart of FIG. 13.

Figure 21:
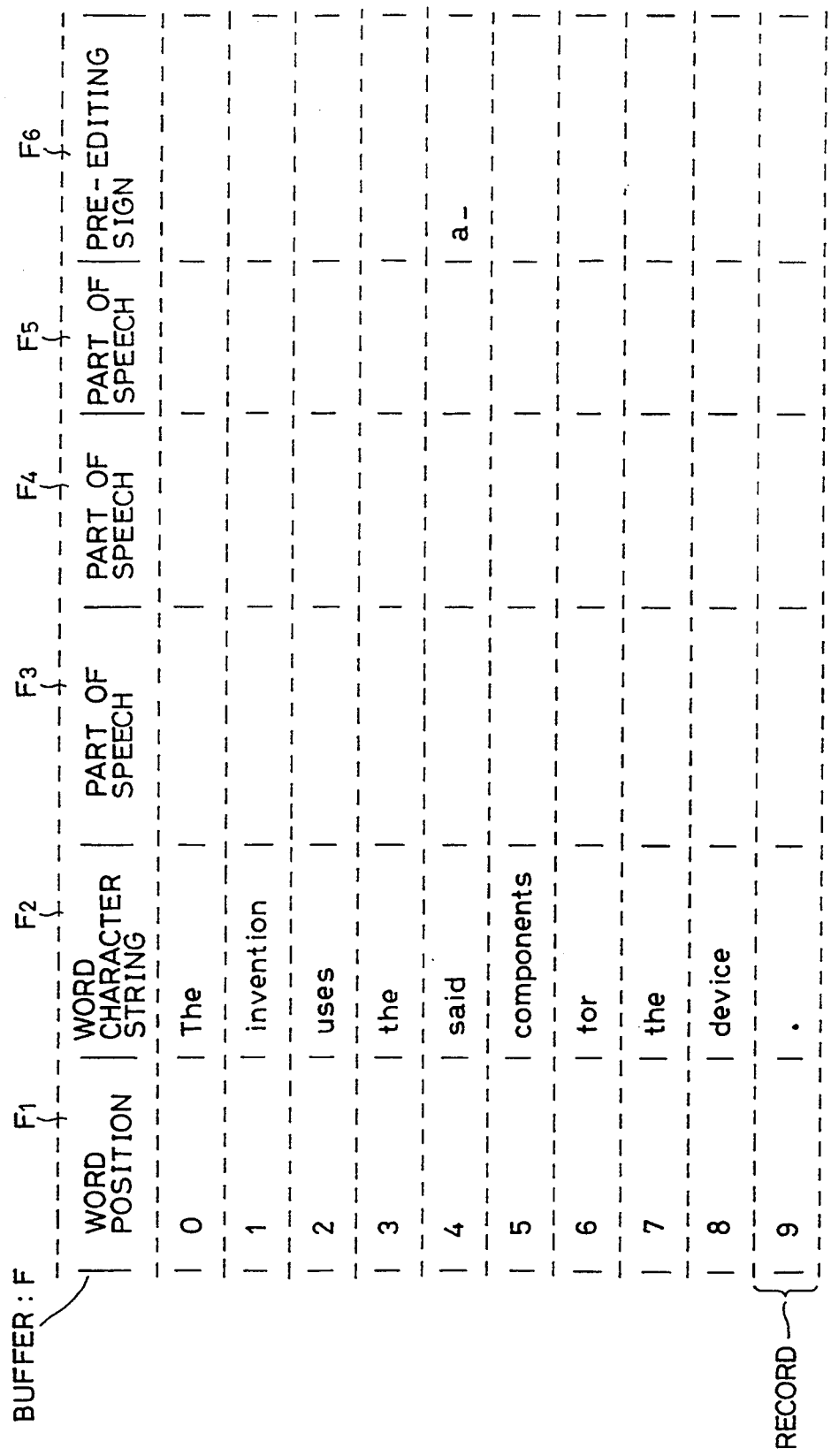
FIG. 21 is a diagram showing an example of contents of a buffer F which is referred to at the time of carrying out the process according to the flow chart of FIG. 13.

FIG. 21 is a diagram showing an example of the contents of buffer F which is referred to at the time of carrying out the process according to the flow chart of FIG. 13.

FIG. 22 is a diagram showing an example of the contents of buffer F of FIG. 21 after data is updated.

Figure 23A:
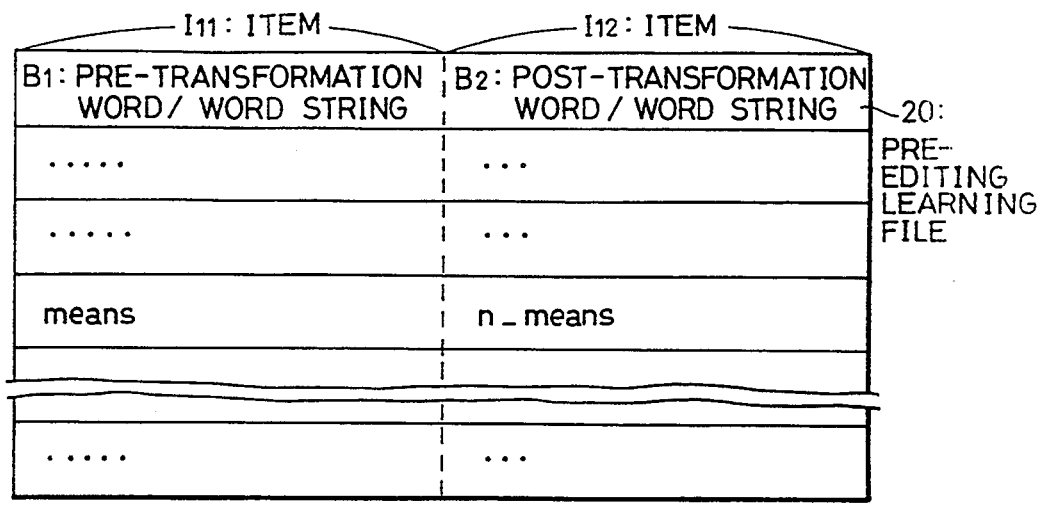
FIGS. 23A to 23C show an example of contents of a pre-editing learning file according to the third embodiment of the present invention.
Figure 23B:
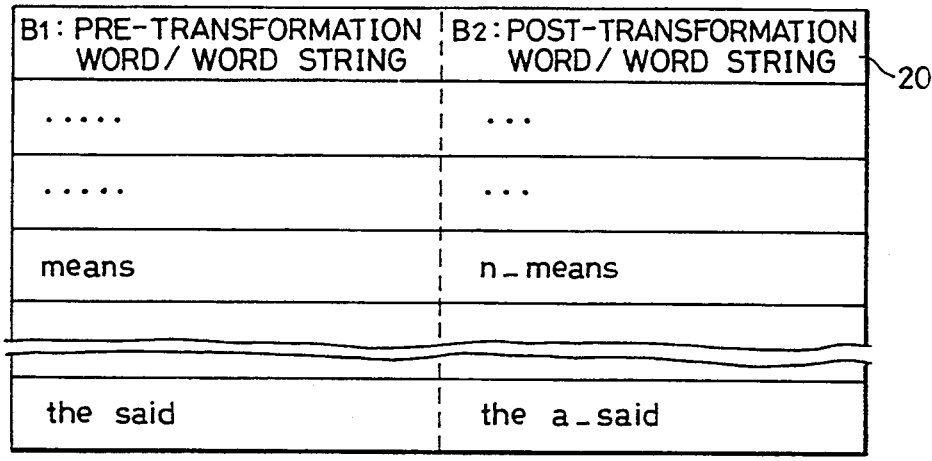
Figure 23C:
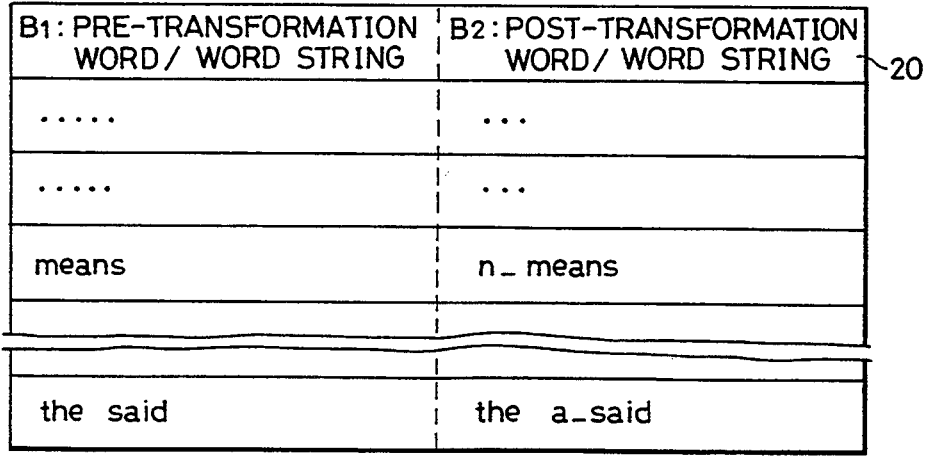

FIGS. 23A to 23C show an example of the contents of a pre-editing learning file according to the third embodiment of the present invention.

Referring to FIG. 14, a sign "g_[]" designating learning of pre-editing means that pre-editing of a character string enclosed by the sign "g_["and the sign"]" in the original should be learned. The detail of learning of the pre-editing will be described hereinafter.

Description will now be given to a function of learning pre-editing in the electronic translating apparatus of FIG. 1, by taking as examples, <1> a process of learning pre-editing signs attached to the original, and <2> a translation process using information of previously learned pre-editing signs.

<1> Process learning pre-editing signs attached to the original

The following description relates to a learning function of pre-editing signs. Therefore, it is assumed that a pre-editing learning file desired by the user, which will be described later, has been selected in advance. Pre-editing learning files desired by users are prepared in the fields of patent law, general law, economics, current topics and the like according to purposes of the users. It is assumed in the following translation process that a learning file is selected by the user according to the field of the original to be translated.

It is assumed that a plurality of learning files prepared by users according to various purposes, buffers A to F to be described hereinafter, and translated sentences are stored in memory 6.

In the electronic translating apparatus of FIG. 1, the original to be translated may be applied sentence by sentence utilizing keyboard 4 by the user, or the original may prestored in memory 6 so that CPU 1 can read the original from memory 6 as necessary.

FIG. 15 shows an example of a screen display on display portion 3 of the translation result obtained by using the learning function in the electronic translating apparatus of FIG. 1. Description will be given to the process in which an English sentence shown in FIG. 15 (corresponding to the original) is translated into a Japanese sentence shown in FIG. 15 (corresponding to translation).

The English sentence of No. 1 of FIG. 15 "The invention uses the said components for the device." is entered through, for example, keyboard 4 to be applied to translation module 5 by control of CPU 1. The English sentence is subjected to the translation process of translation module 5, and the Japanese sentence of No. 5 of FIG. 15 can be obtained. In the translation result, the part of speech of the word "said" is interpreted as a verb although it should be interpreted as an adjective, causing a mistranslation. On the contrary, it is assumed that the English sentence of No. 2 of FIG. 15 "The invention uses g_[the a_said] components for the device." is applied to the electronic translating apparatus after carrying out pre-editing to the original. When the pre-edited English sentence of No. 2 is translated, the Japanese sentence of No. 6 which is a correct translation result can be obtained. The detail will be described hereinafter.

Referring to the flow chart of FIG. 13, at step S1 (referred to as S1 in the figure), a character string in the original (the English sentence of No. 2 of FIG. 15) is set in buffer A (cf. FIG. 16).

In the step of S2, a detection is carried out as to whether or not the pre-editing sign "g_[]" is included in the character string in buffer A. If the sign "g_[]" exists in the character string, the character string between "g_["and "]" is set in buffer B as a post-transformation word/word string B2. At the same time, a character string excluding a pre-editing sign (in this case, a sign "a_") from the character string of word/word string B2 is set in buffer B as a pre-transformation word/word string B1. As a result, word/word string B1 and word/word string B2 are set in buffer B as "the said" and "the a_said", respectively (cf. FIG. 17). In this example, a pre-editing sign which should be learned is only one in the original stored in buffer A. Therefore, only one pair of word/word strings B1 and B2 is stored in buffer B. However, if different pre-editing signs which should be learned are inserted into a plurality of portions in the original stored in buffer A, a plurality of pairs of word/word strings B1 and B2 will be stored in buffer B.

In the process of step S3, a character string of the original excluding the learning designation sign "g_[]" from the character string stored in buffer A is set in buffer C (cf. FIG. 18).

Then, the process goes to step S4. A matching is carried out between each of words/word strings in a character string stored in buffer C of FIG. 18 and pre-transformation word/word string B1 ("the said") in buffer B. If a word/word string in the character string stored in buffer C matches the word/word string B1, the matched word/word string in the original is replaced with a corresponding post-transformation word/word string B2 ("the a_said") in buffer B to be set in buffer D. As a result, even if there are a plurality of portions required for the same pre-editing in the original stored in buffer A, pre-editing may be effected on only one portion by using the sign "g_[]" representing learning designation. By carrying out pre-editing to the only one portion, the same pre-editing sign is attached to the other portions. Therefore, as a result of the process of step S4, the character string as shown in FIG. 19 will be stored in buffer D.

Description will be given to the pre-editing learning file which can be selected by each user with reference to FIGS. 23A to 23C. The original to be translated now is a sentence peculiar to a patent field as shown in FIG. 15. Therefore, the user selects a pre-editing learning file 20 in the patent field accordingly. A pre-editing learning file 20 includes items I11 and I12 as shown in the figure. A plurality of pre-transformation words/word strings B1 are stored in item I11, and words/word strings B2 corresponding to respective words/word strings B1 stored in item Ill are stored in item I12.

Return to the flow chart of FIG. 13. In the process of step S5, it is checked whether or not a pre-editing learning file has already been-selected by the user. If it has not been selected yet, the process goes to step S7 and thereafter. However, pre-editing learning file 20 has already been selected now, the process goes to step S6 in response to determination of step S5.

At step S6, a matching is carried out between words/word strings in the original stored in buffer D and respective pre-transformation words/word strings B1 stored in item Ill of pre-editing learning file 20. If a matching is detected, the matched word/word string in the original in buffer D is replaced with post-transformation word/word string B2 corresponding to learning file 20, and the result is set in buffer E. Conversely, if no matching is detected, the contents of buffer D are directly stored in buffer E (cf. FIG. 20). A global replacement of character strings in the original using the sign "g—[]" and pre-editing learning file 20 is thus completed.

Then the process goes to step S8. At step S8, a determination is made as to whether or not any value is set in buffer B. If it is determined that no value is set in buffer B, the process goes to step S10, which will be described hereinafter. If it is determined that any value is set in buffer B, the contents of buffer B are stored in pre-editing learning file 20 additionally in the process of step S9, and pre-editing learning file 20 is updated. Buffer B is cleared. The state of pre-editing learning file 20 at the time of completion of the operation is updated from the state of FIG. 23A to the state of FIG. 23B.

Then, the process goes to a dictionary look-up process of step S10. The character string set in buffer E is divided into word units while looking up dictionary data D1, and set in buffer F after separating the pre-editing sign "a—" (cf. FIG. 21). As shown in FIG. 21, buffer F includes a plurality of records. Each record includes a word position F1, a word character string F2, three parts of speech F3 to F5, and a pre-editing sign F6. The word character string F2 is a character string of each word obtained by division of the character string set in buffer E into word units. The word position F1 represents positional information of corresponding word character string F2 in the character string of buffer E. The three parts of speech F3 to F5 store information on part of speech obtained by looking up dictionary D1 and information on part of speech designated by corresponding pre-editing sign F6. The pre-editing sign F6 is a pre-editing sign which has been attached to corresponding word character string F2. After dividing the character string set in buffer E into word units and separating the pre-editing sign, the character string is set in buffer F of FIG. 21. Then, information such as on the part of speech and morph attribute of each word character string F2 is obtained by looking up dictionary data D1 to be set in corresponding parts of speech F3 to F5. For simplicity of explanation, description will not be given to the morph attribute. The state where the information obtained by looking up dictionary data D1 is set in buffer F is shown in FIG. 22.

Then the step goes to step S11. A process is carried out according to instruction of pre-editing sign F6 (in this case, the pre-editing sign "a—") with respect to the information stored in buffer F of FIG. 22. In other words, referring to FIG. 22, out of candidate parts of speech of the word character string F2 ("said") to which the pre-editing sign "a—" is attached, a part of speech (in this case, "verb") other than "adjective" (cf. FIG. 4A) which the pre-editing sign "a—" designates is eliminated from buffer F. The state of buffer F obtained by this elimination is not shown. It is the state where the part of speech F3 "verb" corresponding to the word character string F2 ("said") is eliminated from the state of buffer F shown in FIG. 22. As a result, the morphological analysis using dictionary data D1 and learning file 20 in dictionary look-up morphological analysis portion 11 of FIG. 2 is completed, and the morpheme string obtained by the analysis is applied to syntax analysis portion 12 of the succeeding stage.

The process returns to the above-described step S5. If it is determined that a pre-editing learning file is not selected by the user, in the process of step S7, the character string in buffer D shown in FIG. 19 is divided into word units to be stored in buffer F as shown in FIG. 21. Then, the process of step S10 and thereafter is carried out similar to the above.

As described above, the pre-editing process of the original using dictionary data D1 and learning file 20 according to the flow chart of FIG. 13 is carried out, and the pre-edited original is morphologically analyzed. The morpheme string thus obtained is applied to syntax analysis portion 12. Syntax analysis portion 12 creates a syntax analysis tree by interpreting word character string F2 ("said") as "adjective", since information on a part of speech F3 ("verb") of the word position F1=4 in buffer F of FIG. 22 is eliminated. The obtained syntax analysis tree goes through a transformation portion 13 and a generation portion 14 so that the translation of No. 6 of FIG. 15 is indicated together with the English sentence of No. 2 on display portion 3 or the like. The translation process of the original and learning (update of learning file 20) by using the sign "g—[]" instructing learning of pre-editing are completed.

<2> Translation process by using information of the previously learned pre-editing sign.

As described above, after completion of the learning process of the pre-editing sign, when the English sentence of No. 3 of FIG. 15 is entered in translation module 5 as an original, the process according to the flow chart of FIG. 13 is again carried out in dictionary look-up morphological analysis portion 11.

It is assumed that pre-editing learning file 20 (cf. FIG. 23B) has been selected by the user. It is also assumed that buffers A to F are cleared whenever the original of one sentence is entered.

When the English sentence of No. 3 of FIG. 15 is entered, analysis portion 11 carries out the process of steps S1 to S5 of FIG. 13 similar to the above. At this time, since the sign "g—[]" instructing learning of the pre-editing sign is not included in the entered original, the English sentence of No. 3 is directly stored in buffer D. No value is stored in buffer B.

Since pre-editing learning file 20 has been selected, the process goes to step S6 according to the determination result of step S5.

In the process of step S6, a word/word string in a character string stored in buffer D is retrieved/replaced based on the contents of pre-editing learning file 20 shown in FIG. 23B. In other words, since the pre-transformation word/word string B1 in file 20 of FIG. 23B is detected in the English sentence of No. 3 in buffer D, the detected word/word string is replaced with corresponding post-transformation word/word string B2 "the a—said" in file 20. Then, the character string of buffer D is set in buffer E. In this case, the state of buffer E is similar to that of FIG. 20.

In the process of step S8, a determination is made as to whether or not any value is in buffer B. As described above, since any value is not set in buffer B regarding the English sentence of No. 3, the process goes to step S10. In the process of step S10, the contents of buffer E (cf. FIG. 20) are stored in buffer F (FIG. 21), and a dictionary look-up process is carried out with respect to the contents of buffer F, so that the result is again set in buffer F (cf. FIG. 22). As a result, the pre-editing process using dictionary data D1 and the learning information on the previous pre-editing of English sentence of No. 3 is completed.

Similarly, via syntax analysis portion 12, transformation portion 13 and translated sentence generation portion 14, the Japanese sentence of No. 7 as shown in FIG. 15 is obtained for the English sentence of No. 3, and the result is indicated on display portion 3 or the like with the original and the translation in a corresponding format.

When the English sentence of No. 4 shown in FIG. 15 is applied to the electronic translating apparatus, dictionary look-up morphological analysis portion 11 carries out the process of steps S1 to S4 of FIG. 13 similar to the above. Therefore, "It v_means that the component is good." is stored in buffer D. Since the English sentence of No. 4 does not include the sign "g_[]" instructing learning of pre-editing, no value is stored in buffer B.

In the process of step S5, since it is determined that pre-editing learning file 20 (cf. FIG. 23) has been selected by the user, the process goes to step S6 accordingly.

In the process of step S6, a matching is carried out between a word/word string in a character string stored in buffer D and pre-transformation word/word string B1 in pre-editing learning file 20. However, since the word/word string "v_means" in buffer D and word/word string B1 ("means") do not match, replacement using the post-transformation word/word string B2 ("n_means") is not carried out. Therefore, "It v_means that the component is good." is set in buffer E.

In the process of step S8, it is determined that no value is stored in buffer B. Therefore, the Japanese sentence of No. 8 shown in FIG. 15 can be obtained via the process of steps S10 and S11. In other words, "v_means" in the English sentence of No. 4 is translated with the word "means" designated as "verb" as shown in FIG. 4A. As described above, the priority of the process of pre-editing signs is (1) a pre-editing sign existing in the original, (2) a pre-editing sign which is designated to be learned at the other portion in the same original (that is, a pre-editing sign stored in buffer B), and (3) a pre-editing sign learned in advance in pre-editing learning file 20.

As is clear from the above, in the present invention, the contents of the pre-editing process carried out by the user is selectively learned for each pre-editing learning file arbitrarily selected by the user. As a result, it is possible to decrease the necessity as much as possible of the pre-editing process which frequently occurs in a particular field. This is carried out more effectively as the learning progresses. In the state where a pre-editing learning file has been selected, when it is not desired that the pre-editing information learned previously with respect to a particular word/word string in the original is applied, application of the previous pre-editing learning file can be avoided by carrying out the individual pre-editing process to the corresponding word in the original. As described above, it is possible to enhance efficiency of the pre-editing work by the user, as well as the working efficiency of the whole translation work using the electronic translating apparatus.

In order to cancel the pre-editing learning information registered in pre-editing learning file 20, a pre-editing sign such as, for example, a pre-editing sign "c_[]", which instructs cancel of the learning information is provided in advance. If there is a character string enclosed by the sign "c_["and the sign"]" in the original, the pre-editing learning information can be canceled by eliminating from pre-editing learning file 20 data on a character string (pre-transformation word/word string B1) having the pre-editing sign "c_[]" excluded from the character string.

By indicating the result (the contents of buffer E) obtained by applying the contents of buffer B or the contents of selected pre-editing learning file 20 to the original on display portion 3 or the like, it is possible to indicate how the original applied to the apparatus was pre-edited in the apparatus as desired.

In order to know what kind of pre-editing process has been learned previously, it is possible to confirm the previous learning process by indicating the content of recent pre-editing learning file 20 (cf. FIG. 23C) on display portion 3 or by printing out the same at a printer 7 as desired.

In the embodiments of the present invention, efficiency of retrieval of pre-editing learning file 20 shown in FIGS. 23A to 23C is not mentioned. However, in order to enhance the efficiency of the whole translation work, the contents of pre-editing learning file 20 are sorted with pre-transformation word/word string B1 used as a key to be stored and an index is created for the sorted keys. It is also possible to retrieve pre-editing learning file 20 at a high speed by using the index.

In the electronic translating apparatus according to the embodiments, since it is possible to arbitrarily select whether or not to learn a particular pre-editing, the pre-editing process can be achieved with fewer side effects compared to unconditional learning of pre-editing. The side effect here refer to a bad influence affected when the learning contents of pre-editing are applied to another original. More specifically, if the apparatus does not include the selection operation of whether or not to learn the particular pre-editing, the apparatus learns that the word "means" is always a character string "n_means" (not verb but noun) to which a pre-editing sign is attached. As a result, when the original to be translated is not a patent related document, mistranslation frequently occurs. For example, when the original to be translated is in the field of patent law, it is not a problem that the part of speech "means" is designated as a noun in most cases. However, when the original relates to another field, such as economics, it is better to translate the word "means" after designating it as a verb. Therefore, when translating the original in the economics field, selection may be made so that the word "means" should not be learned. On the other hand, when translating the original in the patent field, since the word "means" is frequently used as noun, it is better that the selection is made so that the word should be learned.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic translating apparatus for carrying out a translation process to an original to provide a translation for said original, comprising:
externally operable input means;

sign string insertion means for inserting a sign string or sign strings supporting said translation process into said original through said input means;

storage means for storing information supporting said translation process and said sign string or sign strings; and translation control means, receiving said original having at least one inserted sign string, for carrying out said translation process while interpreting said sign string or strings in said original based on information corresponding to the inserted sign string or strings which is/are stored in said storage means, wherein at least one of said inserted sign string or strings is defined by said electronic translating apparatus.

2. The electronic translating apparatus as recited in claim 1, wherein said translation control means comprises:

original input means for receiving said original having at least one inserted sign string defined by said electronic translating apparatus;

first specifying means for specifying a sign string or strings defined by a user;

second specifying means for specifying the sign string or strings defined by said electronic translating apparatus; and means for carrying out said translation process of the original received by said original input means while interpreting based on information, stored in said storage means, which corresponds to each of the inserted sign strings which are specified by said first or second specifying means.

3. The electronic translating apparatus as recited in claim 1, further comprising:

learning designation means for designating and attaching a learning designation to a word/word string if a sign string should be learned;

learning means for learning said sign string which has been designated by said learning designation means in association with said word/word string to which said learning designation is attached; and editing means for editing by attaching to a learned word/word string a sign string which is relevant to the learned word/word string, wherein said translation control means further includes first translation control means, receiving an original which has been edited by said editing means, for carrying out said translation process while interpreting the sign string or strings in said original based on the information supporting said translation process stored in said storage means.

4. The electronic translating apparatus as recited in claim 2, further comprising:

learning designation means for designating and attaching a learning designation to a word/word string if a sign string should be learned;

learning means for learning said sign string which has been designated by said learning designation means in association with said word/word string to which said learning designation is attached; and editing means for editing by attaching to a learned word/word string a sign string which is relevant to the learned word/word string, wherein said translation control means further includes first translation control means, receiving an original which has been edited by said editing means, for carrying out said translation process while interpreting the sign string or strings in said original based on the information supporting said translation process stored in said storage means.

5. The electronic translating apparatus as recited in claim 3, wherein said learning means further includes file storage means for storing a plurality of files in advance and sequentially storing, in a selected one of said files, said sign string designated by said learning designation means in association with said learned word/word string to which a learning designation is attached, said editing means further includes first editing means for editing said original by attaching, to a learned word/word string stored in said selected file out of a plurality of word/word strings in the original, said sign string relevant to the learned word/word string.

6. The electronic translating apparatus as recited in claim 4, wherein said learning means further includes file storage means for storing a plurality of files in advance, and sequentially storing, in a selected one of said files, said sign string designated by said learning designation means in association with said learned word/word sting to which a learning designation is attached, said editing means further includes first editing means for editing said original by attaching, to a learned word/word string stored in said selected file out of a plurality of word/word strings in the original, said sign string relevant to the learned word/word string.

7. The electronic translating apparatus as recited in claim 5, characterized in that said plurality of files stored in said file storage means include a file prepared for each field to which a descriptive content of said original belongs or file for each user occupation of said electronic translating apparatus, and wherein the selection of a file from said plurality of files is according to the field to which the descriptive content of the original to be translated belongs or according to the occupation of the user of said electronic translating apparatus.

8. The electronic translating apparatus as recited in claim 6, characterized in that said plurality of files stored in said file storage means include a file prepared for each field to which a descriptive content of said original belongs or a file for each user occupation of said electronic translating apparatus, and wherein the selection of a file from said plurality of files is according to the field to which the descriptive content of the original to be translated belongs or according to the occupation of the user of said electronic translating apparatus.

* * * * *